Jan. 12, 1971　　　A. GITSON　　　3,555,126
METHOD OF MAKING A MOLD AND MOLDING A BIFOCAL LENS
Filed Dec. 19, 1967　　　　　　　　　　　　　3 Sheets-Sheet 1
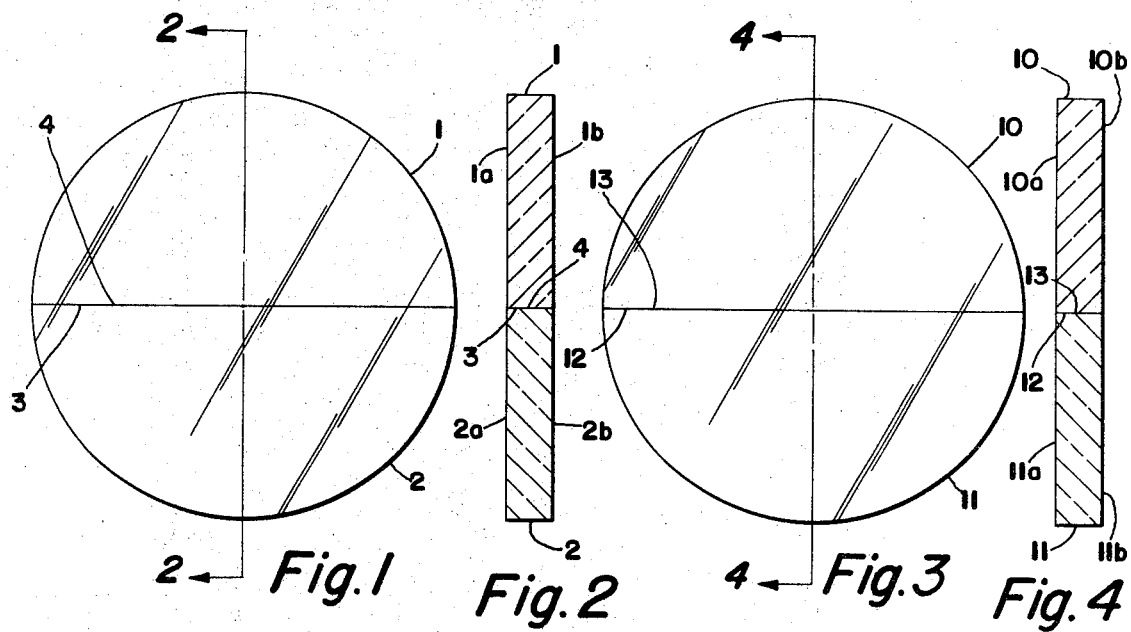
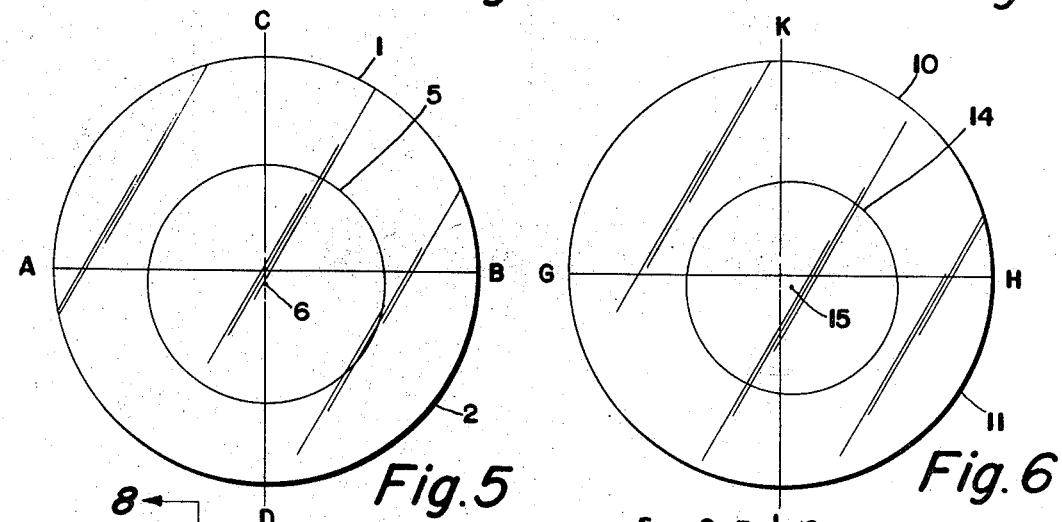
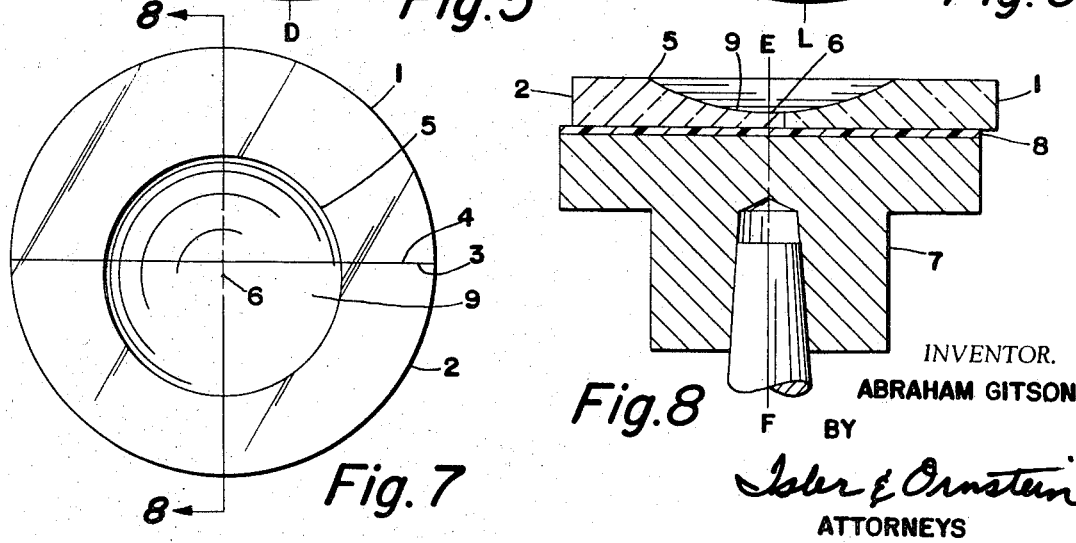
INVENTOR.
ABRAHAM GITSON
BY
Isler & Ornstein
ATTORNEYS Jan. 12, 1971   A. GITSON   3,555,126
METHOD OF MAKING A MOLD AND MOLDING A BIFOCAL LENS
Filed Dec. 19, 1967   3 Sheets-Sheet 2

INVENTOR.
ABRAHAM GITSON
BY
*Isler & Ornstein*
ATTORNEYS

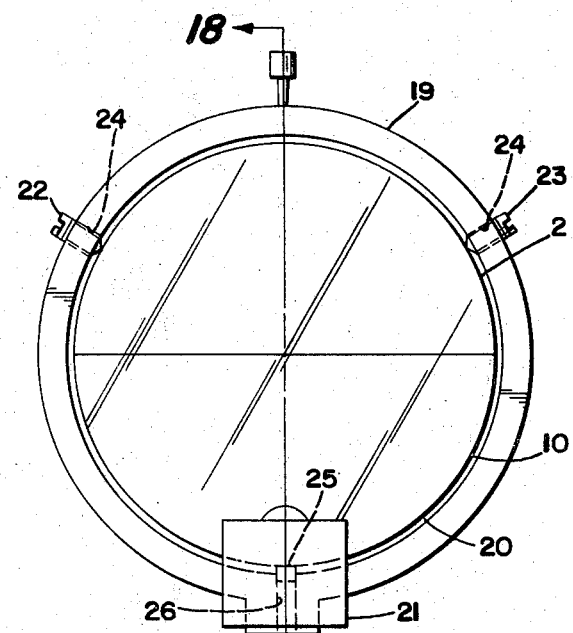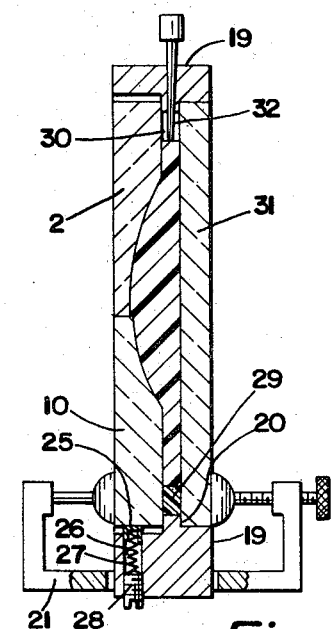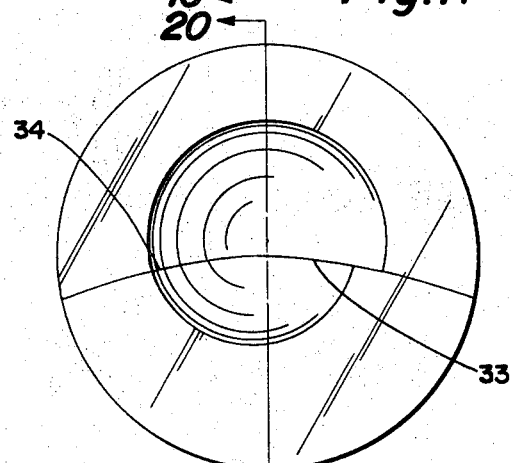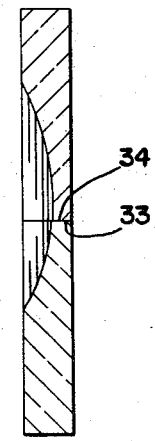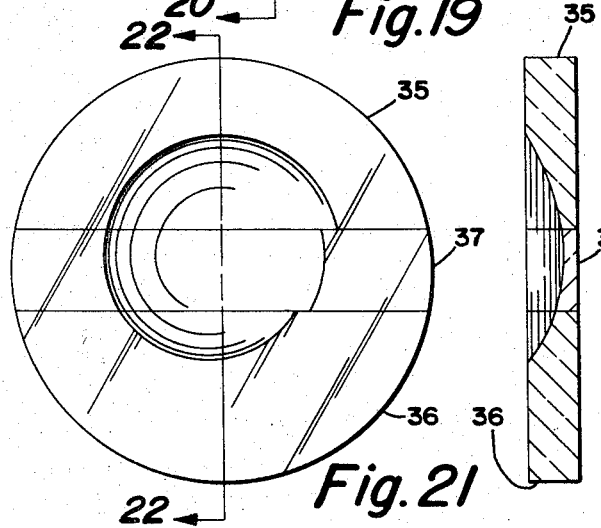

United States Patent Office 3,555,126
Patented Jan. 12, 1971

3,555,126
METHOD OF MAKING A MOLD AND MOLDING A BIFOCAL LENS
Abraham Gitson, 15705 Van Blvd., Cleveland, Ohio 44120
Filed Dec. 19, 1967, Ser. No. 691,828
Int. Cl. B29c 1/02; B29d 11/00
U.S. Cl. 264—1     3 Claims

ABSTRACT OF THE DISCLOSURE

The invention is concerned with the manufacture of bifocal lenses and the like, in which the reading and distance fields are entirely independent of each other; with the reading fields being decentered nasalward from the distance fields, and with each field being set accurately at the required interpupillary distance, whereby eyestrain resulting from use of the lenses is virtually eliminated.

---

In the Whitney Pat. 3,109,696, a method of making plastic lenses is described, in which a mold portion for casting plastic lenses is formed by mounting a first disk of relatively rigid material, such as glass, having a relatively high melting point on a holder, dividing the disk into two section, grinding and polishing a predetermined first surface curvature on the exposed side of the divided disk, mounting a second disk of a rigid material, such as flint or barium crown glass, having a lower melting point than the first disk onto a holder, dividing the second disk into two sections, removing the respective divided disks from their holders, placing the divided edge of a section of the first disk in edge-to-edge relation with the divided edge of a section of the second disk, securing the edges together while in said relation and grinding and polishing a second surface on the assembled sections of a predetermined curvature in overlapping relation with and at such an angle with respect to the first surface formed on the section of the first disk as to position the ultimate optical center of the cast lens resulting from said surface at a desired location and simultaneously controlling the depth of said grinding and polishing of said second surface so as to reduce the focal field resulting from said first surface to the desired size and shape.

The first surface referred to is designed to produce the "reading" field in the cast lens, while the second surface is designed to produce the "distance" field in the cast lens.

The edges, in one instance, are secured together by fusion, and while it is stated in the patent that the temperature of fusion is controlled, as is possible by reason of the different softening points of the respective glasses of the segments, so that the previously ground and polished surface of the reading field will not distort during the fusing, but since fusion of the edges implies or necessitates actual melting of the edges, it is virtually impossible, irrespective of the nature of the glasses used for the segments, to avoid substantial distortion of the ground and polished surface of the reading field, which, after the segments are fused together, cannot be reground.

The patent further discloses that although the segments for the reading portion and distance portion of the mold are preferably fused together, that they may also be joined by cementing or the like, but this does not obviate the grinding and polishing of the second surface on the assembled section.

It is further obvious from the disclosure in the aforesaid Whitney patent that in grinding and polishing the second surface, that this surface is ground about a center which lies on a line normal to and which passes through the reading portion of the lens at the location desired of the optical center of the reading portion, so that the center of the reading portion of the ultimate lens and the center of the distance portion of such lens coincide, as a result of which these centers, when the lenses are mounted in a frame, have the same interpupillary distance.

The distance portions of the lenses, as made in accordance with the Whitney patent, have little or no correction for distance vision, so that if the optical centers of the reading portions of the lenses are at the required interpupillary distance, it is inconsequential that the distance portions of the lenses are at the same interpupillary distance as the reading portions.

However, if the distance portions of the lenses are designed or required to have substantial correction for distance vision, as, for example, in lenses made for postoperative cataract patients, is is essential that the distant portions of the lenses be at a required interpillary distance or spacing which is different than the interpupillary distance or spacing of the reading portions of the lenses, since otherwise the patient or wearer of the lenses, in looking through the reading portions of the lenses which are of themselves at the proper interpupillary spacing, is subjected to considerable eyestrain by reason of the effect of the distance portions of the lenses on the eye muscles.

Ordinary bifocal lenses are laid out by placing the centers of the distance or major portions of the lenses, at the exact interpupillary spacing required for the distance vision. The reading segments are then decentered nasalward to the spacing required for the reading interpupillary dimension. This, however, is not accomplished in the aforesaid Whitney patent, and such decentering has heretofore been confined to conventional methods of making bifocal or multifocal lenses, as, for example, as disclosed in the Hancock Pat. 3,245,745.

In making bifocal lenses by such conventional methods, and particularly where the lenses have any substantial degree of correction for distance vision, the patient, as previously noted, is subjected to considerable eyestrain due to the effect on the eye muscles of having to look through the distance fields or portions of the lenses at the same time he is reading and looking through the reading fields or portions of the lenses.

My invention has as its primary object the manufacture of bifocal plastic lenses having reading and distance portions or fields which are entirely independent of each other, with the reading portions or fields being decentered nasalward from the distance portions or fields, and with each portion or field being set accurately at the required interpupillary distance, whereby the eyestrain to which reference has been made is virtually eliminated.

Another object of the invention is to provide a method of molding such lenses, as well as to provide the molds themselves.

A further object of the invention is to provide a method for molding such lenses, in which glass disks or segments of disks are employed as molds for making the plastic lenses, and the disks are ground and polished to provide the desired finished curvature for the convex side of the lenses, as well as the required depth and area for the reading and distance portions of the lenses.

A still further object of the invention is to provide a method of the character described, in which no fusion is required, so that no distortion of the mold surfaces can occur, whereby accuracy in the molding or casting of the lenses is assured.

A still further object of the invention is to provide a method of the character described, in which the step of grinding and polishing a second surface on the assembled molds is eliminated.

Other objects and advantages of my invention will be apparent during the course of the following description.

In the accompanying drawings forming a part of this specification, and in which like numerals are employed to designate like parts throughout the same, FIG. 1 is a plan view of two of the pieces used for preparing a mold for manufacturing a plastic lens in accordance with the invention, the pieces being shown in assembled relation;

FIG. 2 is a vertical cross-sectional view, taken on the line 2—2 of FIG. 1;

FIG. 3 is a view similar to FIG. 1, but showing two other pieces used for preparing a mold for manufacturing lenses in accordance with the invention, the pieces being shown in assembled relation;

FIG. 4 is a vertical cross-sectional view, taken on the line 4—4 of FIG. 2;

FIG. 5 is a view similar to FIG. 1, but showing the lay-out of the area of the assembled pieces which is to be ground and polished to provide a mold portion for the distance segment of the lens;

FIG. 6 is a view similar to FIG. 2, but showing the layout of the area of the assembled pieces which is to be ground and polished to provide a mold portion for the reading segment of the lens;

FIG. 7 is a view similar to FIG. 5, but showing the assembled pieces mounted on a block, and ground and polished to provide a mold portion for the distance segment or area of the plastic lens;

FIG. 8 is a cross-sectional view, taken on the line 8—8 of FIG. 7;

FIG. 17 is a plan view, showing the manner in which the mold portions are assembled and clamped, preparatory to the use thereof for molding a plastic lens;

FIG. 18 is a cross-sectional view, taken on the line 18—18 of FIG. 17;

FIG. 19 is a view similar to FIG. 11, but showing a modification of the invention;

FIG. 20 is a cross-sectional view, taken on the line 20—20 of FIG. 19;

FIG. 21 is a view similar to FIG. 11, but showing a modification embodying the manufacture of trifocal lenses, and FIG. 22 is a cross-sectional view, taken on the line 22—22 of FIG. 21.

Figure 9:
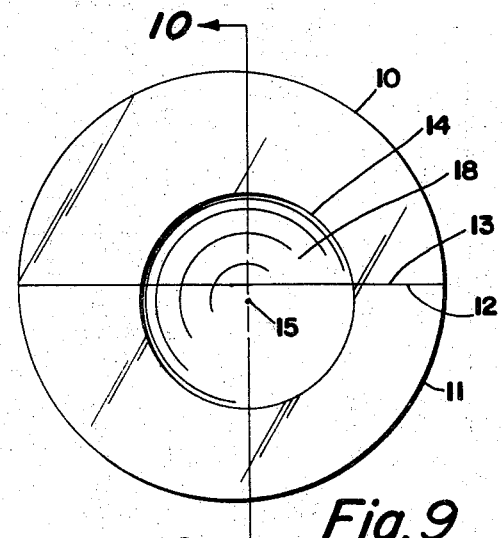
FIG. 9 is a view similar to FIG. 6, but showing the assembled pieces mounted on a block, and ground and polished to provide a mold portion for the reading segment or area of the plastic lens.
Figure 10:
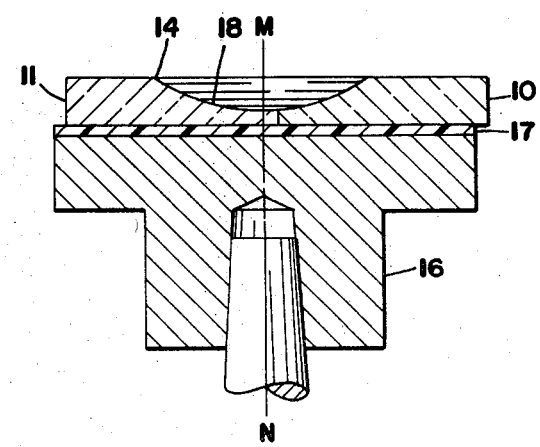
FIG. 10 is a cross-sectional view, taken on the line 10—10 of FIG. 9.

Referring more particularly to FIGS. 1 through 18 of the drawings, there is disclosed, in FIGS. 1 and 2, a pair of semi-circular pieces 1 and 2, preferably of glass, and having their top and bottom sides 1a, 1b, 2a and 2b ground flat and parallel with each other, and their respective ground edges 3 and 4 in abutment with each other.

In practice, the pieces 1 and 2 will be about 71 mm. in diameter, and have a thickness of about 10 mm.

Referring to FIG. 5, the line A–B designates the horizontal axis of the assembled pieces 1 and 2 or line of demarcation between these pieces, and the line C–D the vertical axis, which bisects the line A–B.

A circle 5, of about 40 mm. diameter, is drawn or scribed about a center 6, which is located on the axis C–D, at a point about 2 mm. below the line A–B. This location below the line A–B may be varied within limits, in accordance with the location and area of the distance segment required for the wearer of the lens.

The assembled pieces, as shown in FIG. 5, are mounted on a block or holder 7 (FIGS. 7 and 8) by means of a suitable layer 8 of adhesive or the like, which may be any of the commonly known pitch, low melting metal or other type.

The assembled pieces are so mounted that the center 6, to which reference has been made, coincides with the axis E–F of the block or holder 7, and the area bounded by the circle 5 is then ground and polished to provide a mold surface 9 and of the desired depth at the center 6, this surface 9 being preferably an aspheric rather than a spherical surface.

Referring to FIGS. 3 and 4, there is disclosed a pair of semi-circular pieces 10 and 11, preferably of glass, and having their top and bottom sides 10a, 10b, 11a and 11b ground flat and parallel with each other, and their ground edges 12 and 13 in abutment with each other.

Referring to FIG. 6, the line G–H designates the horizontal axis of the assembled pieces 10 and 11, or line of demarcation between these pieces, and the line K–L the vertical axis which bisects the line G–H.

A circle 14, of slightly smaller diameter than the circle 6, is drawn or scribed about a center 15, which is located at a point about 2 mm. below the line G–H, and about 2 mm. to the right of the line of axis K–L. This location below the line G–H and to the right of the line K–L may be varied within limits, in accordance with the location and area of the reading segments required for the wearer of the lens.

The assembled pieces, as shown in FIG. 6, are mounted on a block or holder 16 (FIGS. 9 and 10) by means of a suitable layer 17 of adhesive or the like, similar to the layer 8 which has already been described.

The assembled pieces are so mounted that the center 15 to which reference has been made, coincides with the axis M–N of the block or holder 16, and the area bounded by the circle 14 is then ground and polished to provide a mold surface 18, approximately of the same depth as the surface 9, at the center 15, this surface 18 being preferably an aspheric rather than a spherical surface.

After the mold pieces 1, 2, 10 and 11 have been ground in the manner described, they are removed from their respective blocks 7 and 16, and the pieces 1 and 11 are discarded, leaving the pieces 2 and 10 for use in a manner to be now described.

The piece 10, which has the mold surface 18 therein, is inverted, so as to position the edge 12 thereof at the top of the piece. The piece 2, which has the mold surface 9 therein, is also inverted, so as to position the edge 4 thereof at the bottom of the piece.

Figure 11:
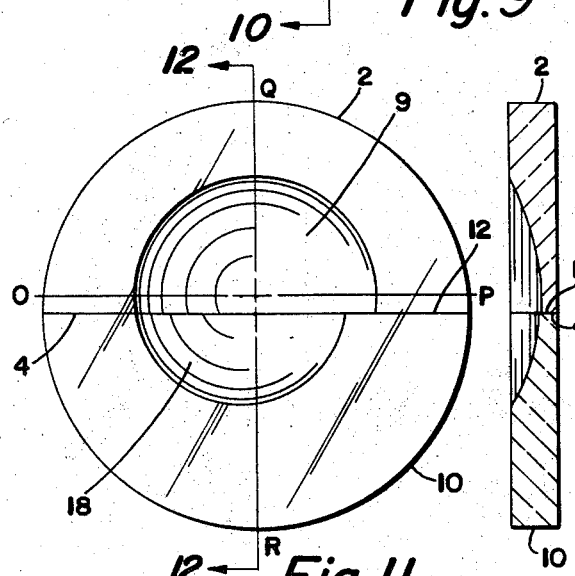
FIG. 11 is a view similar to FIG. 1, but showing the mold portions of FIGS. 7 and 9 in properly assembled relation to provide the mold for forming the convex side of the plastic lens.
Figure 12:
FIG. 12 is a vertical cross-sectional view, taken on the line 12—12 of FIG. 11.
Figures 13, 14:
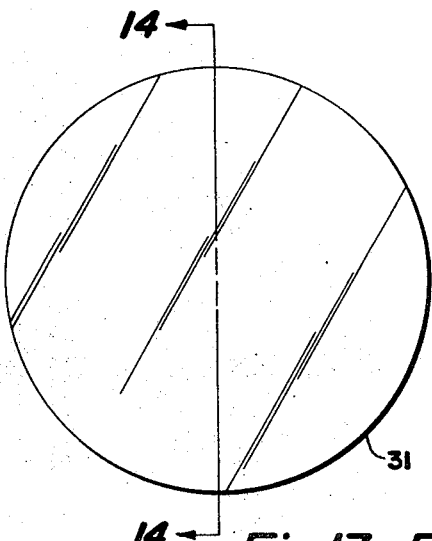
FIG. 13 is a view similar to FIG. 1, but showing a disk which provides the portion of the mold which coacts with those shown in FIG. 11 to provide the complete mold for the manufacture of the plastic lens.
FIG. 14 is a cross-sectional view, taken on the line 14—14 of FIG. 13.
Figure 15:
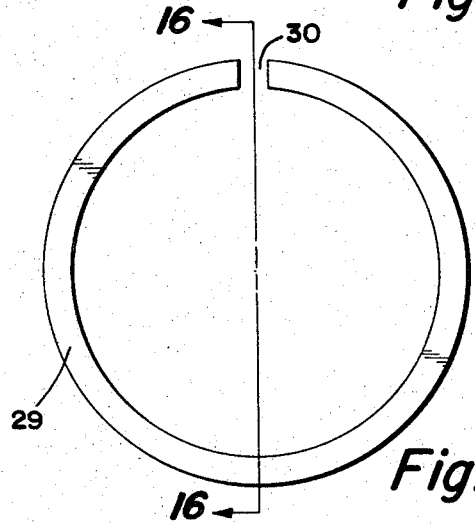
FIG. 15 is a plan view of a gasket used in the manufacture of the lens.
Figure 16:
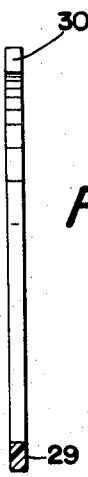
FIG. 16 is a cross-sectional view, taken on the line 16—16 of FIG. 15.

The pieces 10 and 2 are then assembled in the manner shown in FIGS. 11 and 12, and in which the line O–P corresponds to the line A–B in FIG. 5, and the line Q–R corresponds with the vertical axis C–D in FIG. 5. In this assembly of the mold pieces 10 and 2, the mold is designed to mold the lens for the right eye of the wearer, and the surface 18 is decentered to the left in relation to the center of the surface 9. In molding the lens for the left eye of the wearer, the surface 18 is decentered to the right in relation to the center of the surface 9, it being understood that necessary changes are made in the layouts of the surfaces 18 and 9 of the mold pieces for the molding of the lens for the left eye, to accomplish this purpose.

Referring now to FIGS. 13 to 18 inclusive, the molding of the lens will now be described.

For this purpose, an annular ring or collar 19 is provided, having an inwardly projecting spacing rib 20 extending around its inner surface and against which the mold pieces are pressed by means of C-clamps 21. Only one such clamp is shown, but it will be understood that a number of these clamps are disposed around the mold assembly.

Prior to attachment of the C-clamps 21 to the mold assembly, the mold pieces 10 and 2 are placed in the ring 19 against the rib 20, and are centered in the ring by means of set screws 22 and 23 mounted in apertures 24 in the ring, and by a plunger 25 which bears resiliently against the mold piece 10 to clamp the mold piece 10 to the mold piece 2. The plunger 25 is slidably mounted in an aperture 26 in the ring, and is urged against the mold piece 1 by means of a compression coil spring 27, against which an adjustable screw 28 bears. The pressure of the spring 27 may be adjusted by means of the screw 28.

A gasket 29 (FIGS. 15 and 16) is then inserted in the ring 19, this gasket having a thickness approximately that of the rib 20, and an external diameter substantially the same as the internal diameter of the rib 20, so that the gasket fits snugly inside this rib. The gasket 29 is split, as at 30, for a purpose to be presently described.

A disk 31 (FIGS. 13 and 14) of glass having flat ground sides is then inserted in the ring 19 and bears against the rib 20 and gasket 29 to provides a mold piece which coacts with the mold pieces 10 and 2 to form a mold for molding the lens.

The liquid plastic material or monomer, of which the lens is formed, is introduced into the cavity of the mold assembly by means of a hypodermic needle 32, the inner end of which extends into the split 30 of the gasket 29.

The plastic lens, as thus molded, is allowed to solidify or polymerize by placing the assembly in an oven for curing, and when the curing process is complete, the mold assembly is removed from the oven and disassembled, the molds being removed from the lens.

The inner surface of the glass disk 31, instead of being flat, may have its central portion of any desired curvature, such as spherical or cylindrical, for the purpose of forming the concave side of the lens.

When the lenses for the left and right eyes have been molded in this manner, they are assembled with a frame in which the reading fields are set with their centers at the proper interpupillary distance for reading, and the distance fields will automatically have their centers set at the proper interpupillary distance for distance vision.

Since the reading fields or segments are entirely independent of the distance segments, and are not superimposed thereon, the wearer of the glasses, in looking through the reading segments, does not have his eye muscles subjected to the strain of simultaneously looking through the portion of the distance segments which he would have to look through if the reading segments were superimposed on the distance segments.

Consequently, the wearer of the glasses, being relieved of such eyestrain, can read with comfort for long periods.

The disks used for molding the lenses are ground and polished to provide the desired finished curvatures for both sides of the lenses, and no auxiliary or subsequent grinding or polishing is required, as in the Whitney patent.

Since no fusion of the mold pieces to each other is required, no distortion of the mold surfaces can occur, so that accuracy in the molding or casting of the lenses is assured.

Due to the fact that the mold cavities for the reading and distance fields of the lenses are ground to substantially the same depth, the extent or area of the line of division between the fields in the finished lenses is reduced to a minimum, and this adds to the comfort of the wearer.

Instead of having the upper edge of the reading segment in FIG. 11 spaced below the line O-P to the extent shown, this upper edge may coincide with this line, or placed at any other point between the position shown and said line. This merely involves reducing the area of the distance segment, and increasing the area of the reading segment.

Moreover, the cavities may be ground in circular areas of larger diameter than those shown, and may, in fact, be ground to diameters approaching the peripheries of the mold pieces.

The molds, as thus described, have a straight line between the distance and reading fields. This line, may, however, assume a slightly curved form, as shown, for example, in FIGS. 19 and 20, wherein the meeting edges 33 and 34 respectively of the distance and reading fields of the mold pieces have an arcuate form. This may be accomplished by using blanks as shown in FIGS. 1 and 3, but having curved abutting edges, or by grinding these edges to this form, if the blanks have edges which are initially flat.

In FIGS. 21 and 22 of the drawings, a modification of the invention is shown, in which mold pieces are provided for molding trifocal lenses. In this modification, the mold pieces 35 and 36, containing the cavities for the distance and reading fields, are similar to the pieces 2 and 10 respectively in FIGS. 11 and 12, but portions of the lower part of the mold piece 2 and the upper part of the mold piece 10 are ground to provide a space between the mold pieces 35 and 36 to accommodate a mold piece 37 having a cavity therein designed to provide an intermediate distance field in the molded lens.

As shown in FIG. 21, the cavity in the piece 37 is decentered from the cavity in the piece 35, and the cavity in the piece 36 is decentered from the cavity in the piece 37, the decentering, in each case, being such that in the finished trifocal glasses, the distance, intermediate, and reading fields will each be independent of each other and each will be at the required interpupillary distance.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. The method of forming a mold and molding plastic lens comprising providing a first pair of semi-circular pieces of rigid material, placing said pieces with their flat edges in abutment with each other, providing a second pair of semi-circular pieces of a rigid material, placing said last-named pieces with their flat edges in abutment with each other, grinding a cavity in the first pair to provide a finished distance field for the lenses to be molded which cavity is disposed in both pieces of the first pair, grinding a cavity of lesser area than the first-named cavity in the second pair of pieces to provide a finished reading field for the lenses to be molded which cavity is disposed in both pieces of said second pair, said second cavity having a center which is decentered laterally from the center of said second pair of pieces, selecting a piece from each pair, positioning and mounting the selected piece from the first pair with its flat edge in abutment with the flat edge of the selected piece from the second pair, and with the cavity in the selected piece from the first pair adjacent the cavity in the selected piece from the second pair, and with the center of the cavity in the selected piece from the second pair decentered in relation to the center of the cavity of the selected piece from the first pair and with the circular marginal edges of the abutting selected pieces in registry at the juncture between said abutting pieces, said positioning and mounting being effected without fusion of the abutting flat edges of the selected pieces in forming a mold cavity and molding a lens in said mold cavity.

2. The method, as defined in claim 1 wherein the cavity in each of said selected pieces is spherical and is bounded by an arcuate edge which terminates at the flat edges of the pieces and wherein the spherical cavity in one of said selected pieces is positioned adjacent the spherical cavity in the other of said selected pieces such that one end of an arcuate edge of one cavity meets with one end of an arcuate edge in the other of said selected pieces.

3. The method, as defined in claim 1, including the step of providing pieces having flat top and bottom surfaces, which are substantially parallel with each other for said cavity grinding steps.

References Cited

UNITED STATES PATENTS

| | | | |
|---|---|---|---|
| 2,885,827 | 5/1959 | Emerson | 351—177 |
| 3,109,696 | 11/1963 | Whitney | 264—1 |
| 3,245,745 | 4/1966 | Hancock | 351—167 |
| 3,258,840 | 7/1966 | Hedgewick et al. | 264—1 |
| 3,297,422 | 1/1967 | Emerson et al. | 264—1 |
| 3,277,535 | 10/1966 | Rupert | 18—44 |
| 3,417,959 | 12/1968 | Schultz | 249—117 |

DONALD J. ARNOLD, Primary Examiner

A. H. KOECKERT, Assistant Examiner

U.S. Cl. X.R.

18—39; 249—161, 164; 264—219; 351—168, 177